(12) United States Patent
Monckton

(10) Patent No.: US 8,099,391 B1
(45) Date of Patent: Jan. 17, 2012

(54) INCREMENTAL AND DIFFERENTIAL BACKUPS OF VIRTUAL MACHINE FILES

(75) Inventor: Russell David Monckton, Longwood, FL (US)

(73) Assignee: Symantec Corporation, Mountain View, CA (US)

( * ) Notice: Subject to any disclaimer, the term of this patent is extended or adjusted under 35 U.S.C. 154(b) by 366 days.

(21) Appl. No.: 12/405,777

(22) Filed: Mar. 17, 2009

(51) Int. Cl.
*G06F 17/30* (2006.01)

(52) U.S. Cl. ........................................ 707/647

(58) Field of Classification Search .......... 707/640–641, 707/644–648, 650–654
See application file for complete search history.

(56) References Cited

U.S. PATENT DOCUMENTS

| | | | |
|---|---|---|---|
| 6,269,381 B1* | 7/2001 | St. Pierre et al. | 1/1 |
| 6,470,329 B1* | 10/2002 | Livschitz | 1/1 |
| 7,370,164 B1* | 5/2008 | Nagarkar et al. | 711/162 |
| 7,627,727 B1 | 12/2009 | Kekre | |
| 7,669,020 B1 | 2/2010 | Shah | |
| 7,694,088 B1 | 4/2010 | Bromley | |
| 7,694,105 B2 | 4/2010 | Sanvido | |
| 2010/0011178 A1 | 1/2010 | Feathergill | |
| 2010/0049750 A1 | 2/2010 | Srivastava | |
| 2010/0083251 A1 | 4/2010 | Mccrory | |

* cited by examiner

*Primary Examiner* — Thu-Nguyet Le
(74) *Attorney, Agent, or Firm* — Meyertons, Hood, Kivlin, Kowert & Goetzel, P.C.

(57) ABSTRACT

Various embodiments of a system and method for backing up files used by a virtual machine are described herein. The files may be stored within a virtual disk image file. A full backup of the virtual disk image file may first be created. After creating the full backup, one or more incremental or differential backups of the virtual disk image file may be created. In some embodiments, fingerprints of the sectors of the virtual disk image file may be stored and used to identify which sectors should be included in the incremental or differential backups.

17 Claims, 7 Drawing Sheets

Full backup 8

| 000 | 000 | 000 | 000 | 000 | 000 | 000 | 000 |
|---|---|---|---|---|---|---|---|
| 7A | 7B | 7C | 7D | 7E | 7F | 7G | 7H |

Incremental backup 9A

| 001 | 010 | 110 |
|---|---|---|
| 7B | 7E | 7H |

Incremental backup 9B

| 011 | 001 |
|---|---|
| 7B | 7D |

Differential backup 10A

| 010 | 011 | 001 | 010 | 110 |
|---|---|---|---|---|
| 7A | 7B | 7D | 7E | 7H |

Virtual disk image file 5

Time T5

| 010 | 011 | 000 | 001 | 111 | 111 | 110 | 110 |
|---|---|---|---|---|---|---|---|
| 7A | 7B | 7C | 7D | 7E | 7F | 7G | 7H |

Incremental backup 9C

| 111 | 111 | 110 |
|---|---|---|
| 7E | 7F | 7G |

INCREMENTAL AND DIFFERENTIAL BACKUPS OF VIRTUAL MACHINE FILES

BACKGROUND OF THE INVENTION

1. Field of the Invention

This invention relates to the field of virtual machines and virtualization software. More particularly, the invention relates to a system and method for performing incremental and differential backups of files used by a virtual machine, where the files are stored in one or more virtual disk image files.

2. Description of the Related Art

A virtual machine (VM), also referred to as a virtual computer, is a software implementation of a machine (computer) that executes programs like a real machine. Virtualization provides the ability for multiple virtual machines to run together on the same physical computer. Each virtual machine may execute its own operating system and may appear to a user of the virtual machine to be the same as an independent physical computer. The software layer that executes on the physical computer and manages the various virtual machines is called a hypervisor or virtual machine host software. The virtual machine host software can run on bare hardware (called a Type 1 or native VM) or under control of an operating system (called a Type 2 or hosted VM).

A user may interact with a virtual machine similarly as if the user were interacting with a physical computer. For example, various software applications may be installed on the virtual machine, and the virtual machine may enable the user to launch the software applications, provide input to the software applications, and view output from the software applications identically as if they were executing on a physical computer.

A virtual machine typically maintains its own set of files, similarly as a physical computer would, such as operating system files, application program files, data files, etc. Whereas the files of a physical computer are typically stored on a hard disk, files of a virtual machine are often stored in one or more virtual disk image files. A virtual disk image file represents the contents and structure of a hard disk drive, e.g., by representing disk sectors. Sectors of the virtual disk image file are allocated as necessary for storing the files used by the virtual machine. In addition to the sector data, the virtual disk image file also includes various data structures for managing the sector data, such as a sector bitmap indicating which sectors are currently in use and store valid data. A virtual disk image file may be formatted according to a particular specification. Virtual disk image file specifications in common use include the Virtual Hard Disk (VHD) format and the Virtual Machine Disk Format (VMDK) format.

SUMMARY

Various embodiments of a system and method for backing up files used by a virtual machine are described herein. The files may be stored within a virtual disk image file. The virtual disk image file may represent a plurality of disk sectors, where data of the plurality of files is stored across the disk sectors. According to one embodiment of the method, a first backup representation of the virtual disk image file may be created by copying data of each sector of the plurality of disk sectors into the first backup representation. After creating the first backup representation and after a subset of the sectors represented by the virtual disk image file have changed, a second backup representation of the virtual disk image file may be created. Creating the second backup representation may comprise determining whether each sector of the plurality of disk sectors represented by the virtual disk image file has changed since the first backup representation was created. For each sector of the plurality of disk sectors that has changed, the virtual disk image file may be used to read data of the sector, and the data of the sector may be stored in the second backup representation. In some embodiments, creating the second backup representation may not include storing in the second backup representation data of sectors that have not changed since the first backup representation was created.

BRIEF DESCRIPTION OF THE DRAWINGS

A better understanding of the invention can be obtained when the following detailed description is considered in conjunction with the following drawings, in which.

Figure 1:
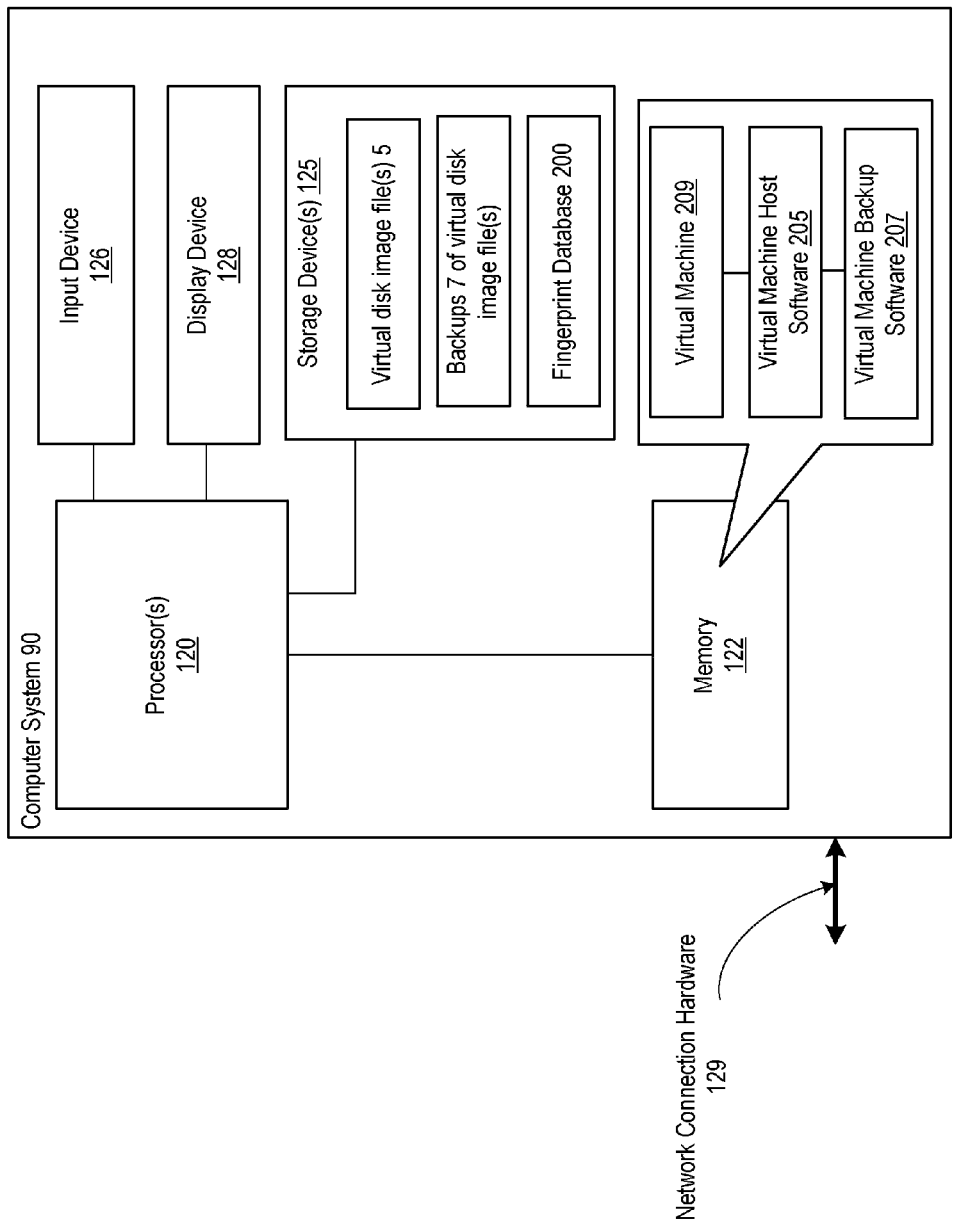
FIG. 1 illustrates an example of a computer system which may implement various embodiments of a method for backing up a virtual disk image file.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for backing up files used by a virtual machine are described herein. Just as it is necessary to backup files of a physical computer, it is also often necessary or desirable to backup the files used by a virtual machine. Backing up the files of the virtual machine helps to protect against data loss and corruption and also enables a previous state of the virtual machine to be recovered if necessary, e.g., to roll back the virtual machine to a state as it existed at a previous point in time.

The files used by the virtual machine may include any of various kinds of files, such as operating system files, application program files, data files, etc. The files used by the virtual machine may be stored within one or more virtual disk image files. Each virtual disk image file may be stored on a physical storage device and may be managed by a file system of a physical computer system, e.g., the physical computer system which executes the virtual machine (or executes the virtual machine host software which manages the execution of the virtual machine).

For a given virtual disk image file containing files of the virtual machine, the method may operate to first create an initial full backup of the virtual disk image file. The full backup is a complete representation of the data of the virtual disk image file as it exists at the time the full backup is created. In some embodiments, the full backup may be created by simply copying the entire virtual disk image file to create a full backup copy of the virtual disk image file. The full backup includes all of the data of the virtual disk image file and is an independent backup which does not depend on any other backup.

After creating the full backup of the virtual disk image file, one or more partial backups of the virtual disk image file may subsequently be created. Each partial backup may include only the sectors in the virtual disk image file which have changed since a previous backup was performed without including sectors which have not changed. Thus, a partial backup is not an independent backup, but instead depends on or is relative to another backup. A partial backup of the virtual disk image file may depend on a full backup of the virtual disk image file (e.g., may represent the sector changes that have occurred since the full backup was created) or may depend on another partial backup of the virtual disk image file (e.g., may represent the sector changes that have occurred since the other partial backup was created).

In some embodiments the system may be configured to create different types of partial backups of a virtual disk image file. One type of partial backup is referred to herein as an incremental backup. An incremental backup represents the sectors of the virtual disk image file that have changed since the last backup (of any type) of the virtual disk image file was created. Another type of partial backup is referred to herein as a differential backup. A differential backup represents the sectors of the virtual disk image file that have changed since the last full backup of the virtual disk image file was created. For example, one or more incremental backups may have been created between the last full backup and the differential backup, but the differential backup is not based on the last incremental backup, but is instead based on the last full backup and includes all the sectors that have changed since the last full backup was created (but not the sectors that have not changed).

In some alternative embodiments a differential backup of the virtual disk image file may also be relative to another differential backup of the virtual disk image file. For example, a first differential backup may be created which represents all the sectors that have changed since the last full backup of the virtual disk image file was created. Subsequently, a second differential backup may be created which represents all the sectors that have changed since the first differential backup was created, regardless of whether or not any incremental backups have been created after the first differential backup.

Unless otherwise specified, the term "partial backup" may herein refer to any type of backup of a virtual disk image file which depends on or is relative to another backup, e.g., either an incremental backup or a differential backup. Creating partial backups instead of full backups may be advantageous in some systems because a partial backup typically requires less (and sometimes much less) storage space than a full backup. The smaller size of a partial backup may also shorten the length of time required to transfer the data to backup media, as well as reduce the amount of network bandwidth used if the backup is transmitted over a network.

FIG. 1 illustrates an example of a computer system 90 which may implement the methods described herein according to some embodiments. In various embodiments the computer system 90 may include any number of individual computers or nodes, e.g., one or more. Thus, the components illustrated in FIG. 1 may be implemented in one or more individual computers or nodes.

The computer system 90 may include one or more processors 120 coupled to memory 122. The processor(s) 120 are representative of any type of processor. For example, in one embodiment, the processor(s) 120 may be compatible with the x86 architecture, while in another embodiment the processor(s) 120 may be compatible with the SPARC™ family of processors.

In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may store program instructions and/or data. For example, the memory 122 may store virtual machine host software 205. The virtual machine host software 205 may implement a hypervisor which manages the execution of a virtual machine 209 executing on the computer system 90, as well as performing other functions supporting the virtual machine 209. The virtual machine 209 may be represented by information loaded into the memory 122 and/or stored on one or more storage devices 125 of the computer system 90. For example, while the virtual machine 209 is being executed the memory 122 may store dynamic memory contents of the virtual machine 209.

The memory 122 may also store virtual machine backup software 207. The virtual machine backup software 207 may execute to create backups of the one or more virtual disk image files 5 which contain the files used by the virtual machine 209. The virtual machine backup software 207 may be configured to create various types of backup images of the virtual disk image file(s) 5, such as full backups, incremental backups, and differential backups.

In some embodiments the virtual machine backup software 207 may be configured to create backups of the virtual disk image file(s) 5 according to a time schedule specified by a user. As an example, the virtual machine backup software 207 may be configured to create a full backup of a particular virtual disk image file on each Monday of each week, and create incremental backups of the virtual disk image file on each of the other days of the week. In this example, the incremental backup created on Tuesday includes the sectors of the virtual disk image file that changed since the time when the full backup was created on Monday. The incremental backup created on Wednesday includes the sectors of the virtual disk image file that changed since the time when the incremental backup was created on Tuesday, and so on. Thus, each Monday a new full backup may be created, and the cycle starts again. This is only an example of a backup schedule, and in various embodiments the virtual machine backup software 207 may be configured to create full backups and various types of partial backups according to any desired schedule. The virtual machine backup software 207 may include a graphical user interface which allows the user to specify the desired time schedule and specify what type of backup (e.g., full, incremental, or differential) to create at each time point.

In other embodiments the user may interactively request a backup of a virtual disk image file 5 used by a virtual machine to be created, and the virtual machine backup software 207 may immediately create the backup in response to the user's request. For example, in some embodiments the user may interact with a graphical user interface of the virtual machine backup software 207 to select which virtual disk image file(s) 5 to backup and select which type of backup to perform. In other embodiments the user may not select the virtual disk image file(s) 5 directly, but may instead select a particular virtual machine 209. The virtual machine backup software 207 may then identify and backup all of the virtual disk image files 5 used by the virtual machine 209.

Referring again to FIG. 1, the memory 122 may also store other software which operates in conjunction with or which is used by the virtual machine backup software 207 and/or the virtual machine host software 205, such as operating system software, file system software, network communication software, device management software, etc.

The computer system 90 also includes one or more storage devices 125. In various embodiments the storage devices 125 may include any of various kinds of storage devices. Examples of storage devices include disk storage units (e.g., devices including one or more disk drives), tape drives (e.g., devices operable to store data on tape cartridges), optical storage devices (e.g., devices operable to store data on optical media), flash memory storage devices, etc. The storage device(s) 125 may be included in or coupled to the computer system 90 in any of various ways, such as coupling through a communication bus, peripheral port, or network.

The storage device(s) 125 may store one or more virtual disk image files 5 which the virtual machine backup software 207 executes to backup according to the methods described herein. Each virtual disk image file 5 is a virtual representation of a hard disk which stores a plurality of files used by a virtual machine 209. For example, a virtual disk image file 5 includes data organized into sectors. The size of the sectors may vary for different virtual disk image files 5, but is typically a common sector size used by physical disk drives, such as 512 bytes or 4096 bytes. The virtual disk image file 5 also includes metadata used to manage the file data. For example, the metadata may specify which sectors in the virtual disk image file 5 are used, as well as the layout of the file data across the sectors. In some embodiments each sector in the virtual disk image file may be the same size. In other embodiments the virtual disk image file may support variable size sectors, and the metadata may specify the size of each sector.

The storage device(s) 125 may also store one or more one or more backups 7 of the virtual disk image file(s) 5. As used herein, the noun "backup" refers to information created in order to backup a virtual disk image file. In various embodiments the information of the backup may be stored according to any of various formats. For example, in some embodiments a backup may be represented using one or more files. In other embodiments a backup may be represented using information stored in a database.

In some embodiments the storage device(s) 125 of the computer system 90 may also store a fingerprint database 200. As described in detail below, the fingerprint database 200 may be used when creating an incremental backup of a virtual disk image file in order to identify which sectors have changed since the previous backup was created. The use of the fingerprint database 200 may eliminate a need for the previous backup to be present locally on the computer system 90, which may advantageously reduce the usage of storage space in some embodiments.

The computer system 90 may also include one or more input devices 126 for receiving user input, e.g., to the virtual machine backup software 207 or to other programs executing on the computer system 90. The input device(s) 126 may include any of various types of input devices, such as keyboards, keypads, microphones, or pointing devices (e.g., a mouse or trackball). The computer system 90 may also include one or more output devices 128 for displaying output, e.g., the graphical user interface of the virtual machine backup software 207. The output device(s) 128 may include any of various types of output devices, such as LCD screens or monitors, CRT monitors, etc.

The computer system 90 may also include network connection hardware 129 through which the computer system 90 couples to one or more networks enabling communication with other computer systems or devices. The network connection 129 may include any type of hardware for coupling the computer system 90 to a network, e.g., depending on the type of network. In various embodiments, the computer system 90 may be coupled to the other computer systems or devices via any type of network or combination of networks. For example, the network may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer or device may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 2:
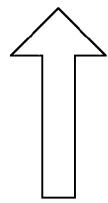
FIGS. 2-6 illustrate an example of creating various types of backups of a virtual disk image file.

FIGS. 2-6 illustrate an example of creating various types of backups of a virtual disk image file 5. As illustrated in FIG. 2, the virtual disk image file 5 includes a plurality of sectors 7A-7H. At a time T1, all the sectors contain data values of "000". (It is noted that FIGS. 2-6 are a simple example for illustrative purposes. In a typical embodiment there would be many more sectors in the virtual disk image file, and each sector would store much more data, such as 512 bytes of data for example.)

FIG. 2 also illustrates a full backup 8 which has been created from the virtual disk image file 5 at the time T1. As shown, the full backup 8 includes a copy of all of the sectors 7A-7H of the virtual disk image file 5. In some embodiments, the virtual machine backup software 207 may create the full backup 8 by simply creating an identical copy of the virtual disk image file 5. In other embodiments the information of the virtual disk image file 5 may be transformed in various ways such that the full backup 8 of the virtual disk image file includes all of the information necessary to re-create the virtual disk image file 5, but where the backup information is not stored in an identical format as the original virtual disk image file 5.

Figure 3:
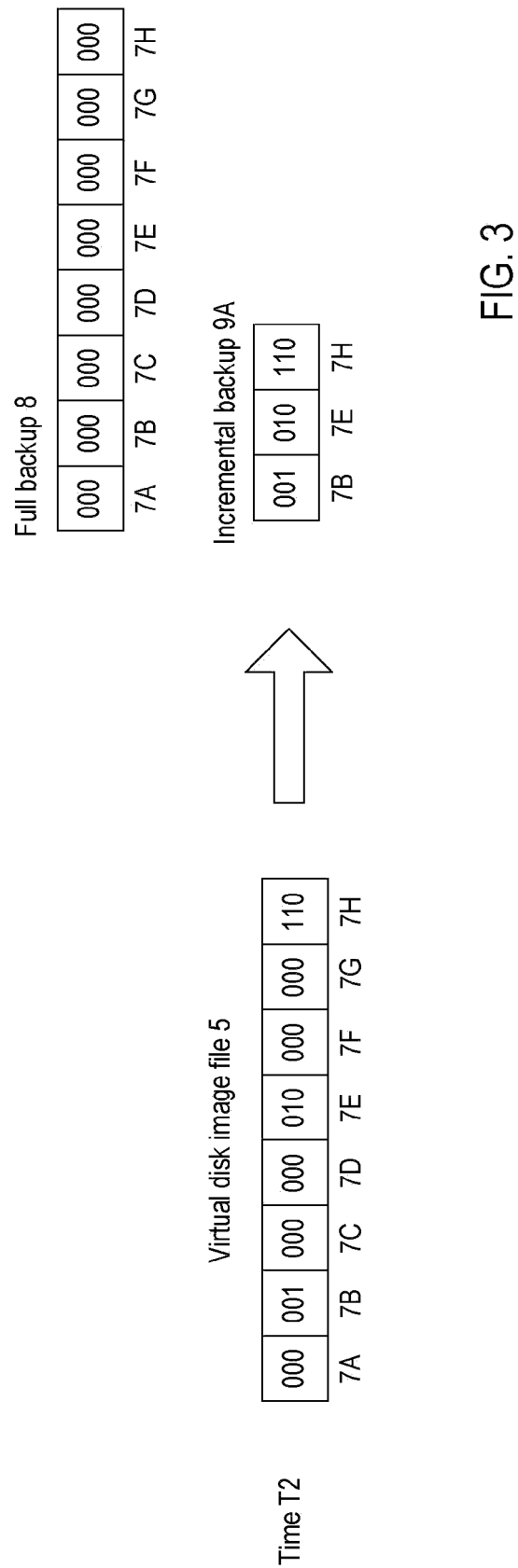

FIG. 3 illustrates the virtual disk image file 5 at a subsequent time T2 after the data of some of the sectors of the virtual disk image file 5 have changed. As shown, the data of the sectors 7B, 7E and 7H has changed since the time when the full backup 8 was created. FIG. 3 also illustrates an incremental backup 9A created by the virtual machine backup software 207 at the time T2. The incremental backup 9A includes the data of the changed sectors 7B, 7E and 7H. For each sector included in the incremental backup 9A, the incremental backup 9A may also include metadata that identifies the sector, such as the sector number or the location of the sector within the virtual disk image file 5. Note that the incremental backup 9A does not include the data of sectors that have not changed since the time T1, e.g., does not include the data of the sectors 7A, 7C, 7D, 7F and 7G.

Thus, the incremental backup 9A effectively represents the difference between the virtual disk image file 5 as it exists at the time T2 and the virtual disk image file 5 as it existed at the time T1. In some embodiments the virtual machine host software 205 may natively support a differencing disk format which represents changes which have occurred in a virtual disk image file 5. In such an embodiment the incremental backup 9A may be implemented by storing a differencing disk file using the native capabilities of the virtual machine host software 205. In other embodiments the incremental backup 9A may be stored in any of various other file formats, or may be represented as information stored in a database.

Figure 4:
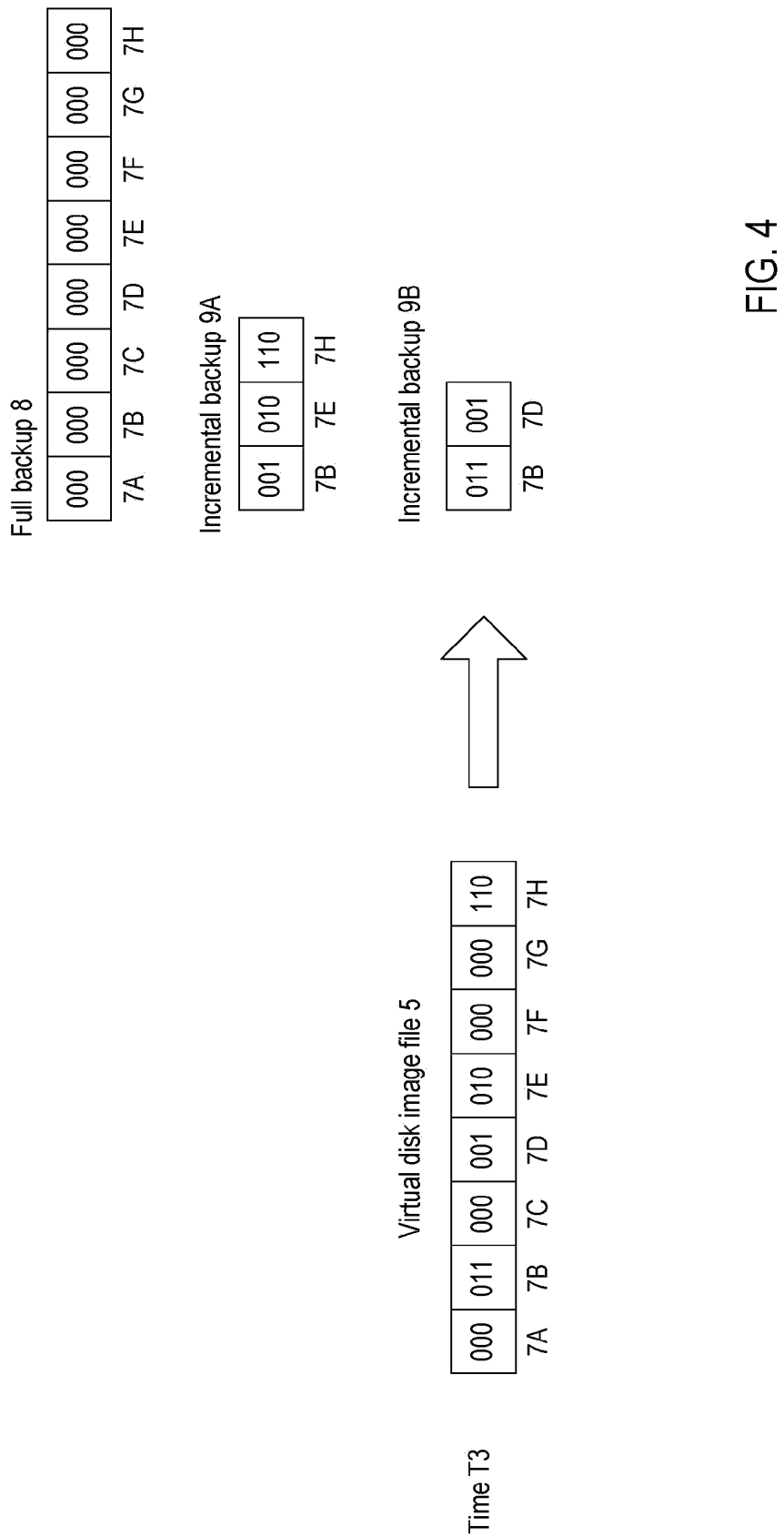

FIG. 4 illustrates the virtual disk image file 5 at a subsequent time T3. As shown, the data of the sectors 7B and 7D has changed since the time T2 when the incremental backup 9A was created. FIG. 3 also illustrates an incremental backup 9B created at the time T3. The incremental backup 9B is based on the last backup that was created, i.e., the incremental backup 9A. The incremental backup 9B includes the data of the sectors 7B and 7D which have changed since the time T2 when the incremental backup 9A was created, but does not include the data of the other sectors of the virtual disk image file 5.

Thus, the incremental backup 9B effectively represents the difference between the virtual disk image file 5 as it exists at the time T3 and the virtual disk image file 5 as it existed at the time T2. Again, for each sector included in the incremental backup 9B, the incremental backup 9B may also include metadata that identifies the sector, such as the sector number or the location of the sector within the virtual disk image file 5.

Figure 5:
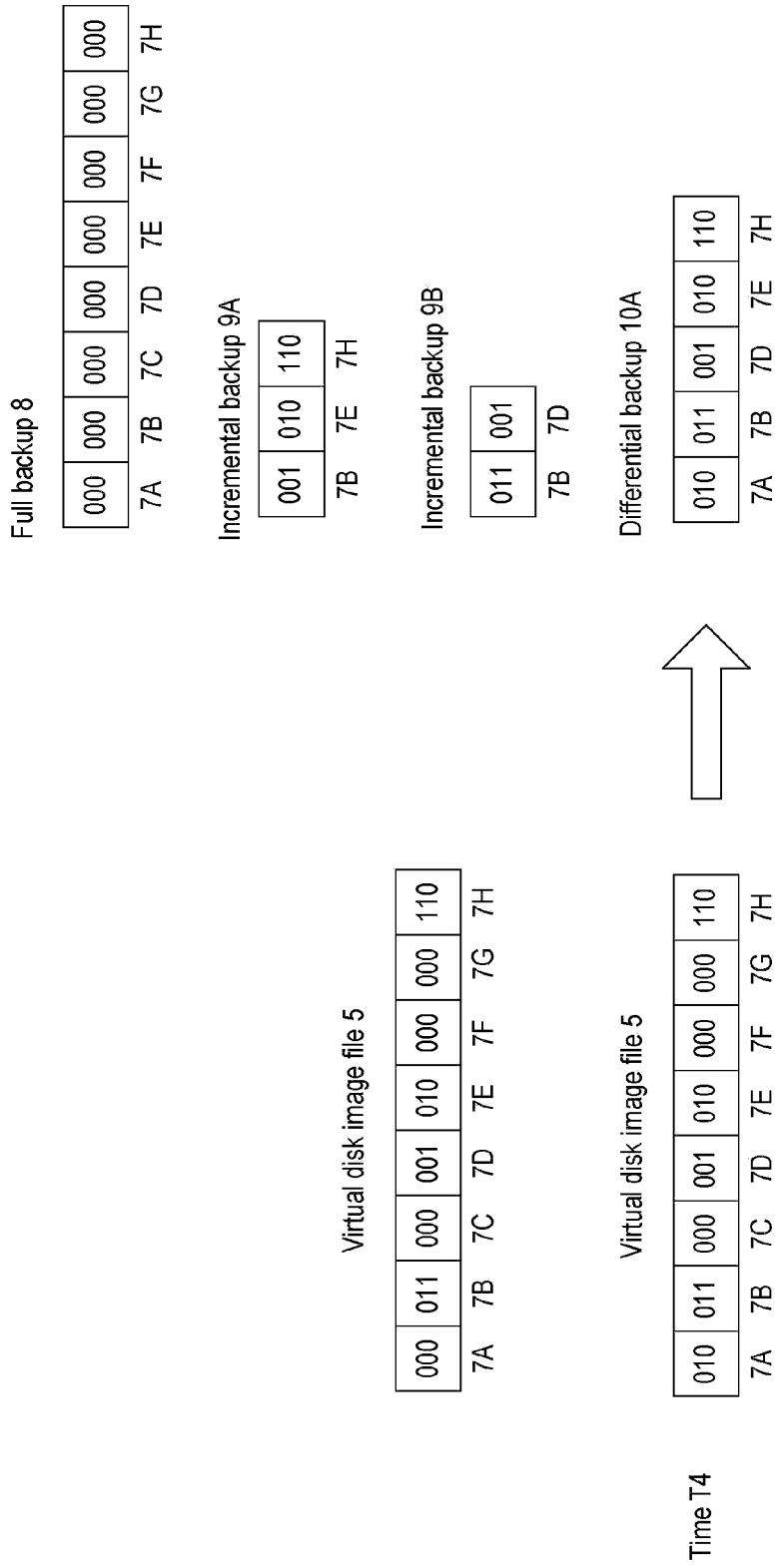

FIG. 5 illustrates the virtual disk image file 5 at a subsequent time T4. As shown, only the data of the sector 7A has changed since the time T3 when the incremental backup 9B was created. FIG. 5 also illustrates a differential backup 10A. Although some incremental backups 9A and 9B have been created since the time T1 when the full backup 8 was created, the differential backup 10A is not dependent upon any of the incremental backups, but instead is based on the full backup 8. Thus, the differential backup effectively represents the difference between the virtual disk image file 5 as it exists at the time T4 and the virtual disk image file 5 as it existed at the time T1 when the full backup 8 was creates. Accordingly, the differential backup 10A includes the data of all the sectors of the virtual disk image file 5 that have changed since the time when the full backup 8 was created, i.e., the data of the sectors 7A, 7B, 7D, 7E and 7H in this example. The differential backup 10A does not include the data of the sectors of the virtual disk image file 5 that have not changed since the time when the full backup 8 was created.

Figure 6:
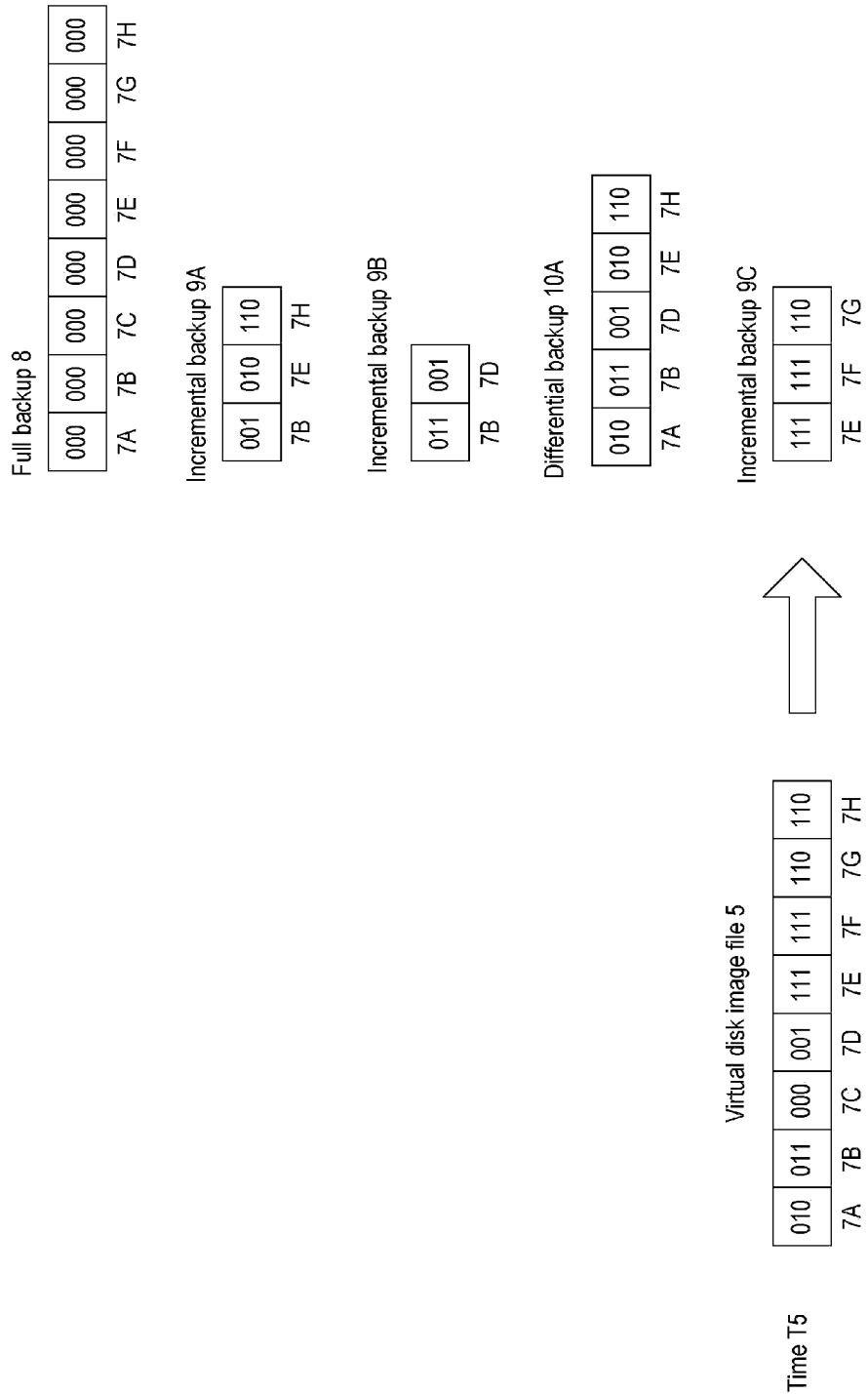

FIG. 6 illustrates the virtual disk image file 5 at a subsequent time T5. As shown, the data of the sectors 7E, 7F and 7G has changed since the time T4 when the differential backup 10A was created. FIG. 3 also illustrates an incremental backup 9C created at the time T5. The incremental backup 9C is based on the last backup that was created, i.e., the differential backup 10A. Thus, the incremental backup 9C includes the data of the sectors 7E, 7F and 7G which have changed since the time T4 when the differential backup 10A was created, but does not include the data of the other sectors of the virtual disk image file 5.

In some embodiments, the virtual disk image file 5 may still be in use during the time when a backup of the virtual disk image file 5 is being created. For example, if the virtual machine 209 which uses the virtual disk image file is still being executed on the computer system 90 at the time when the backup is created, sectors of the virtual disk image file may continue to undergo data changes during the backup operation. However, the backup needs to represent the state of the virtual disk image file at a single instant in time. To solve this problem the virtual machine backup software 207 may create a snapshot of the virtual disk image file and use the snapshot to create the backup. The snapshot effectively represents a point-in-time image of the virtual disk image file. In various embodiments any of various snapshot techniques known in the art may be used to create and maintain the snapshot, such as copy-on-write (COW) snapshot techniques for example. After the backup has been created using the snapshot, the snapshot may be deleted.

In various embodiments the virtual machine backup software 207 may use any of various techniques to determine which sectors of the virtual disk image file have changed since a previous backup was created. In some embodiments this determination may be made by using a fingerprint database and a bitmap identifying which sectors of the virtual disk image file are in use.

In some embodiments, when a full backup of the virtual disk image file is initially performed, a backup copy of the complete virtual disk image file may be created, as discussed above. In many cases, not all of the possible sectors of the virtual disk image file are actually in use at a given time. For example, the virtual disk image file may have a maximum size, but may be only partially filled with file data, or the virtual disk image file may allow for a dynamically expanding virtual disk. Thus, sectors that have not been used to store file data may not exist yet or may not contain valid data. When the full backup of the virtual disk image file is created, the virtual machine backup software 207 may also create information indicating which sectors of the virtual disk image file are actually valid (i.e., in use) at the time the full backup is created. As one example, the virtual machine backup software 207 may create a bitmap, where each possible sector of the virtual disk image file is represented using a single bit having a value of 1 if the sector is currently in use in the virtual disk image file, or a value of 0 if the sector is not currently in use. The virtual machine backup software 207 may store the bitmap in association with the full backup, and the bitmap may be used in subsequent backup operations as described below.

In addition, for each sector in use, the virtual machine backup software 207 may also calculate a fingerprint or ID for the sector based on the data of the sector, e.g., using a hash function or other algorithm. The fingerprint may be significantly smaller in size than the size of the sector. As an example, if the sector size is 512 bytes then the fingerprint calculated using the sector data may be about 8 bytes. The virtual machine backup software 207 may store the fingerprints of the used sectors in a fingerprint database 200, and the fingerprints may be used in subsequent backup operations as described below.

Figure 7:
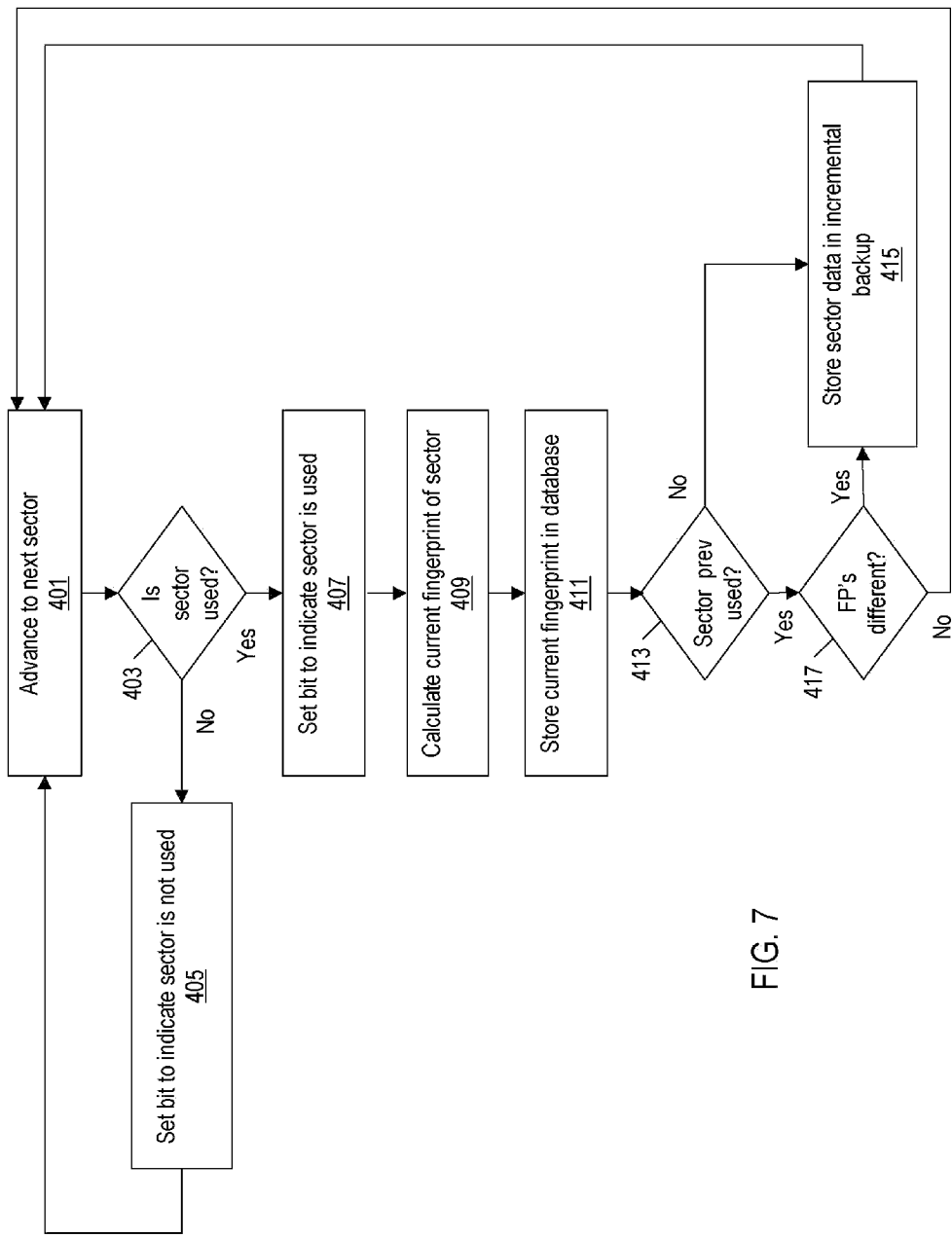
FIG. 7 is a flowchart diagram illustrating one embodiment of a method for creating an incremental or differential backup of a virtual disk image file using previously created sector bitmap and fingerprint information.

Each time that a subsequent partial backup operation is performed, the virtual machine backup software 207 may use the previously created sector bitmap and fingerprint information to determine which sectors to include in the partial backup, and may also create new sector bitmap and fingerprint information to be used for future backups. FIG. 7 is a flowchart diagram illustrating one embodiment of a method for subsequently creating an incremental or differential backup of the virtual disk image file using previously created sector bitmap and fingerprint information. The method may be implemented by the virtual machine backup software 207 executing on the computer system 90.

In block 401 the virtual machine backup software 207 may advance to the next sector (which may be the first sector of the virtual disk image file when beginning the algorithm). In block 403 the virtual machine backup software may examine the metadata of the current virtual disk image file (i.e., the virtual disk image file as it exists at the time the current backup is being created) to determine whether the sector is in use. If not then the virtual machine backup software 407 may simply set a bit indicating that the sector is not currently used in a bitmap to be stored in association with the current backup. If there are still more sectors in the virtual disk image file then the virtual machine backup software 207 may then advance to the next sector.

Otherwise, if the sector is in use in the current virtual disk image file then the virtual machine backup software 207 may set a bit indicating that the sector is currently used in the bitmap to be stored in association with the current backup.

The virtual machine backup software 207 may then calculate the current fingerprint of the sector, as indicated in block 409. To calculate the current fingerprint it is necessary to read the data of the sector from the virtual disk image file. The metadata of the virtual disk image file may be used to read the sector data, e.g., by determining the offset within the virtual disk image file where the sector begins. Once the sector data has been read, a hash algorithm or other algorithm may be applied to calculate the current fingerprint of the sector.

The virtual machine backup software 207 may then store the current fingerprint in the fingerprint database 200, as indicated in block 411. The current fingerprint may be stored in association with the current backup.

The virtual machine backup software 207 may then determine whether the sector was in use at the time when the previous backup was created (where the previous backup is the backup on which the backup currently being created depends). This determination may be made by examining the bitmap information that was previously stored in association with the previous backup to determine whether or not the bit for the sector was set. If the sector was not previously in use then the sector data needs to be stored in the incremental (or differential) backup currently being created, as indicated in block 415. Otherwise, if the sector was previously in use then the sector data may or may not need to be stored in the current incremental backup. The virtual machine backup software may retrieve the fingerprint of the sector previously stored in the fingerprint database 200 in association with the previous backup. As indicated in block 417, if the previous fingerprint is different than the current fingerprint then this indicates that the sector data has changed, and thus, the current sector data needs to be stored in the current incremental backup. Otherwise the sector data has not changed since the previous backup was created, and thus, the virtual machine backup software 207 may simply advance to the next sector without storing the sector data in the fingerprint database 200.

The process described above may be continued until all of the sectors of the current virtual disk image file have been processed. The bitmap and fingerprint information created during the process may be stored in association with the current backup so that they can be used in creating future incremental backups, similarly as described above.

In the embodiment described above, each time a new backup is created, a respective fingerprint is calculated for each sector currently in used in the virtual disk image file and stored in the fingerprint database 200 regardless of whether or not the sector data has changed since the previous backup was created. In other embodiments, only the fingerprints that have changed since the previous backup was created may be stored in the fingerprint database 200, e.g., without storing fingerprints for sectors whose data has not changed since the previous backup. This may advantageously reduce the amount of storage space required to store the fingerprint database 200. In such an embodiment, the determination of whether the current fingerprint for a given sector is different than the fingerprint of the sector at the time the last backup was created may require examining fingerprint information of backups created before the last backup. For example, the virtual machine backup software 207 may search the fingerprint database 200 to find the most recent fingerprint for the sector that was stored in the fingerprint database 200 and use that fingerprint to make the comparison. If the current fingerprint is still the same then this indicates that the sector data is still the same, and thus the sector data does not need to be stored in the current backup, and neither does the current fingerprint need to be stored in the fingerprint database 200. Otherwise, the new sector data may be stored in the current backup, and its new fingerprint may be stored in the fingerprint database 200.

In some embodiments the use of a fingerprint database to determine which sectors of the virtual disk image file have changed since a previous backup was created may eliminate the need to store the previously created backups locally on the computer system 90. This may be especially advantageous when the computer system 90 has a limited amount of storage space since the previous backups can be stored on or moved to an external or remote storage device and only used later if needed for restoring the virtual disk image file to a previous state.

In other embodiments the virtual machine backup software 207 may use any of various other techniques to determine which sectors of the virtual disk image file have changed besides the use of sector fingerprints as described above. For example, in some embodiments the system may be configured to use archive bits or modification timestamps to indicate whether each sector has changed since the previous backup was created. Thus, for example, for each sector in the virtual disk image file, the virtual machine backup software 207 may determine whether a timestamp of the sector indicates that the sector has been modified since the time when the virtual disk image file was last backed up. In yet other embodiments the virtual machine backup software 207 may directly compare the current sector data to the sector data in the previous backup, although this technique may be slower than the other techniques described herein and may require the previous backup to be stored in a location accessible to the virtual machine backup software 207.

Incremental and differential backups created according to the methods described herein may be used to restore individual files of the virtual disk image file. For example, suppose that the plurality of files stored in the virtual disk image file includes a particular file stored across a plurality of sectors. Suppose also that a first subset of the sectors of the file are stored in a differential backup, and a second subset of the sectors of the file are not stored in the differential backup. In this example a restore module of the virtual machine backup software 207 may restore the file by restoring the first subset of the sectors of the file from the differential backup, and restoring the second subset of the sectors of the file from the full backup. This functionality may be implemented in various ways. In some embodiments the full backup and the differential backup may be mounted in a manner consistent with their parent-child relationship such that sectors will be read from the differential backup if they are present there, or otherwise will be read from the full backup. Restoring individual files from an incremental backup may be performed in a similar manner except that more than two backups may be needed for the restoration in cases where there is a chain of several incremental backups leading back to the full backup. In this case, the sectors of the file may be read from the most recent incremental backup in the chain that includes the sectors, or from the full backup if they are not present in any of the incremental backups.

Incremental and differential backups created according to the methods described herein may also be used to restore the entire virtual disk image file if necessary, e.g., if the virtual disk image file was lost or corrupted, or if it becomes necessary to restore the virtual disk image file to a state as it existed at a previous backup point. For each sector of the virtual disk image file, the virtual machine backup software 207 may restore the sector from a differential backup of the virtual disk image file if the differential backup includes the sector, or else may restore the sector from the full backup. Restoring a complete virtual disk image file from an incremental backup may be performed in a similar manner except that each sector of the virtual disk image file may be read from the most recent incremental backup in the chain that includes the sector, or from the full backup if the sector is not present in any of the incremental backups.

As discussed above, a virtual disk image file stores a plurality of files used by a virtual machine. It is noted that in some embodiments, creating an incremental or differential backup of a virtual disk image file as described herein may be performed as part of a process of backing up the entire virtual machine. The virtual machine may be represented as virtual machine information, where the virtual machine information includes the virtual disk image file as well as possibly other information. For example, the virtual machine information may also include one or more configuration files specifying a configuration of the virtual machine. In some embodiments the virtual machine information may also include one or more files representing current dynamic memory contents of the virtual machine, e.g., if the virtual machine is in a hibernated state. Thus, in some embodiments the virtual machine backup software 207 may execute to create an incremental or differential backup of each virtual disk image file used by the virtual machine, as well as to backup the other virtual machine information of the virtual machine. All of the backup information for the virtual machine created during the backup operation may be packaged so that the entire virtual machine can be restored at a future time if necessary.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable to:
at a first time, create a first backup representation of a virtual disk image file that stores a plurality of files used by a virtual machine, wherein the virtual disk image file represents a plurality of disk sectors, wherein data of the plurality of files is stored across the disk sectors, wherein in creating the first backup representation, the program instructions are executable to:
determine whether each disk sector of the virtual disk image file is in use at the first time by examining metadata of the virtual disk image file;
for each respective disk sector that is in not in use at the first time, store information in association with the first backup representation indicating that the respective disk sector is not in use;
for each respective disk sector that is in use at the first time: store information with the first backup representation indicating that the respective disk sector is in use; use the metadata of the virtual disk image file to read data from the respective disk sector; copy the data from the respective disk sector into the first backup representation; compute a first fingerprint for the respective disk sector based on the data of the respective disk sector; and store the first fingerprint for the respective disk sector in association with the first backup representation;
wherein the program instructions are further executable to create a second backup representation of the virtual disk image file at a second time after creating the first backup representation and after a subset of the sectors represented by the virtual disk image file have changed, wherein in creating the second backup representation, the program instructions are executable to:
determine whether each disk sector of the virtual disk image file is in use at the second time by examining the metadata of the virtual disk image file;
for each respective disk sector that is in not in use at the second time, store information in association with the second backup representation indicating that the respective disk sector is not in use;
for each respective disk sector that is in use at the second time: store information with the second backup representation indicating that the respective disk sector is in use; use the metadata of the virtual disk image file to read data from the respective disk sector; compute a new fingerprint for the respective disk sector based on the data of the respective disk sector; store the new fingerprint in association with the second backup representation; determine whether the respective disk sector was previously in use at the first time when the first backup representation was created; if the respective disk sector was not previously in use then copy the data from the respective disk sector into the second backup representation; if the respective disk sector was previously in use then retrieve the first fingerprint for the respective disk sector stored in association with the first backup representation, compare the new fingerprint to the first fingerprint to determine whether the data of the respective disk sector has changed since the first backup representation was created, and copy the data from the respective disk sector into the second backup representation if the respective disk sector has changed.

2. The computer-accessible storage medium of claim 1, wherein creating the second backup representation does not include storing in the second backup representation data of sectors that have not changed since the first backup representation was created.

3. The computer-accessible storage medium of claim 1, wherein the second backup representation is created in response to user input requesting to create one of:
an incremental backup representation of the virtual disk image file;
a differential backup representation of the virtual disk image file.

4. The computer-accessible storage medium of claim 1, wherein the program instructions are further executable to:

after creating the second backup representation, create a third backup representation of the virtual disk image file, wherein creating the third backup representation comprises:
  determining whether each sector of the plurality of disk sectors represented by the virtual disk image file has changed since the second backup representation was created; and
  for each sector of the plurality of disk sectors that has changed since the second backup representation was created, using the virtual disk image file to read data of the sector, and storing the data of the sector in the third backup representation;
wherein creating the third backup representation does not include storing in the third backup representation data of sectors that have not changed since the second backup representation was created.

5. The computer-accessible storage medium of claim 1, wherein the program instructions are further executable to:
  after creating the second backup representation, create a third backup representation of the virtual disk image file, wherein creating the third backup representation comprises:
    determining whether each sector of the plurality of disk sectors represented by the virtual disk image file has changed since the first backup representation was created; and
    for each sector of the plurality of disk sectors that has changed since the first backup representation was created, using the virtual disk image file to read data of the sector, and storing the data of the sector in the third backup representation;
  wherein creating the third backup representation does not include storing in the third backup representation data of sectors that have not changed since the first backup representation was created.

6. The computer-accessible storage medium of claim 1, wherein the program instructions are executable to store the first fingerprint for the respective disk sector in a database, wherein the first fingerprint is retrieved from the database at the second time when the second backup representation is created.

7. The computer-accessible storage medium of claim 1, wherein the virtual disk image file is one of:
  a Virtual Hard Disk (VHD) file;
  a Virtual Machine Disk Format (VMDK) file.

8. The computer-accessible storage medium of claim 1, wherein the plurality of files includes a first file, wherein a first subset of sectors of the first file is stored in the second backup representation of the virtual disk image file, wherein a second subset of sectors of the first file is not stored in the second backup representation of the virtual disk image file;
wherein the program instructions are further executable to restore the first file using the second backup representation of the virtual disk image file, wherein restoring the first file comprises:
  restoring the first subset of sectors of the first file from the second backup representation of the virtual disk image file; and
  restoring the second subset of sectors of the first file from the first backup representation of the virtual disk image file.

9. The computer-accessible storage medium of claim 1, wherein the program instructions are further executable to restore the virtual disk image file using the second backup representation of the virtual disk image file, wherein restoring the virtual disk image file comprises:
for each respective sector of the plurality of disk sectors:
  restoring the respective sector from the second backup representation of the virtual disk image file if the second backup representation of the virtual disk image file includes the respective sector;
  restoring the respective sector from the first backup representation of the virtual disk image file if the second backup representation of the virtual disk image file does not include the respective sector.

10. A system comprising:
one or more processors; and
memory storing program instructions, wherein the program instructions are executable by the one or more processors to:
at a first time, create a first backup representation of a virtual disk image file that stores a plurality of files used by a virtual machine, wherein the virtual disk image file represents a plurality of disk sectors, wherein data of the plurality of files is stored across the disk sectors, wherein in creating the first backup representation, the program instructions are executable by the one or more processors to:
  determine whether each disk sector of the virtual disk image file is in use at the first time by examining metadata of the virtual disk image file;
  for each respective disk sector that is in not in use at the first time, store information in association with the first backup representation indicating that the respective disk sector is not in use;
  for each respective disk sector that is in use at the first time: store information with the first backup representation indicating that the respective disk sector is in use; use the metadata of the virtual disk image file to read data from the respective disk sector; copy the data from the respective disk sector into the first backup representation; compute a first fingerprint for the respective disk sector based on the data of the respective disk sector; and store the first fingerprint for the respective disk sector in association with the first backup representation;
wherein the program instructions are further executable by the one or more processors to create a second backup representation of the virtual disk image file at a second time after creating the first backup representation and after a subset of the sectors represented by the virtual disk image file have changed, wherein in creating the second backup representation, the program instructions are executable to:
  determine whether each disk sector of the virtual disk image file is in use at the second time by examining the metadata of the virtual disk image file;
  for each respective disk sector that is in not in use at the second time, store information in association with the second backup representation indicating that the respective disk sector is not in use;
  for each respective disk sector that is in use at the second time: store information with the second backup representation indicating that the respective disk sector is in use; use the metadata of the virtual disk image file to read data from the respective disk sector; compute a new fingerprint for the respective disk sector based on the data of the respective disk sector; store the new fingerprint in association with the second backup representation; determine whether the respective disk sector was previously in use at the first time when the first backup representation was created; if the respective disk sector was not previously in use then copy the data from the respective disk sector into the second backup representation; if the respective disk sector was previously in use then retrieve the first fingerprint for the respective disk sector stored in association with the first backup representation, compare the new fingerprint to the first fingerprint to determine whether the data of the respective disk sector has changed since the first backup representation was created, and copy the data from the respective disk sector into the second backup representation if the respective disk sector has changed.

11. The system of claim 10,
wherein creating the second backup representation does not include storing in the second backup representation data of sectors that have not changed since the first backup representation was created.

12. The system of claim 10,
wherein the second backup representation is created in response to user input requesting to create one of:
an incremental backup representation of the virtual disk image file;
a differential backup representation of the virtual disk image file.

13. The system of claim 10, wherein the program instructions are further executable by the one or more processors to:
after creating the second backup representation, create a third backup representation of the virtual disk image file, wherein creating the third backup representation comprises:
determining whether each sector of the plurality of disk sectors represented by the virtual disk image file has changed since the second backup representation was created; and
for each sector of the plurality of disk sectors that has changed since the second backup representation was created, using the virtual disk image file to read data of the sector, and storing the data of the sector in the third backup representation;
wherein creating the third backup representation does not include storing in the third backup representation data of sectors that have not changed since the second backup representation was created.

14. The system of claim 10, wherein the program instructions are further executable by the one or more processors to:
after creating the second backup representation, create a third backup representation of the virtual disk image file, wherein creating the third backup representation comprises:
determining whether each sector of the plurality of disk sectors represented by the virtual disk image file has changed since the first backup representation was created; and
for each sector of the plurality of disk sectors that has changed since the first backup representation was created, using the virtual disk image file to read data of the sector, and storing the data of the sector in the third backup representation;
wherein creating the third backup representation does not include storing in the third backup representation data of sectors that have not changed since the first backup representation was created.

15. The system of claim 10,
wherein the plurality of files includes a first file, wherein a first subset of sectors of the first file is stored in the second backup representation of the virtual disk image file, wherein a second subset of sectors of the first file is not stored in the second backup representation of the virtual disk image file;
wherein the program instructions are further executable by the one or more processors to restore the first file using the second backup representation of the virtual disk image file, wherein restoring the first file comprises:
restoring the first subset of sectors of the first file from the second backup representation of the virtual disk image file; and
restoring the second subset of sectors of the first file from the first backup representation of the virtual disk image file.

16. The system of claim 10,
wherein the program instructions are further executable by the one or more processors to restore the virtual disk image file using the second backup representation of the virtual disk image file, wherein restoring the virtual disk image file comprises:
for each respective sector of the plurality of disk sectors:
restoring the respective sector from the second backup representation of the virtual disk image file if the second backup representation of the virtual disk image file includes the respective sector;
restoring the respective sector from the first backup representation of the virtual disk image file if the second backup representation of the virtual disk image file does not include the respective sector.

17. A computer-implemented method comprising:
at a first time, a computer system creating a first backup representation of a virtual disk image file that stores a plurality of files used by a virtual machine, wherein the virtual disk image file represents a plurality of disk sectors, wherein data of the plurality of files is stored across the disk sectors, wherein creating the first backup representation includes:
determining whether each disk sector of the virtual disk image file is in use at the first time by examining metadata of the virtual disk image file;
for each respective disk sector that is in not in use at the first time, storing information in association with the first backup representation indicating that the respective disk sector is not in use;
for each respective disk sector that is in use at the first time: storing information with the first backup representation indicating that the respective disk sector is in use; using the metadata of the virtual disk image file to read data from the respective disk sector; copying the data from the respective disk sector into the first backup representation; computing a first fingerprint for the respective disk sector based on the data of the respective disk sector; and storing the first fingerprint for the respective disk sector in association with the first backup representation;
wherein the method further comprises the computer system creating a second backup representation of the virtual disk image file at a second time after creating the first backup representation and after a subset of the sectors represented by the virtual disk image file have changed, wherein creating the second backup representation includes:
determining whether each disk sector of the virtual disk image file is in use at the second time by examining the metadata of the virtual disk image file;
for each respective disk sector that is in not in use at the second time, storing information in association with the second backup representation indicating that the respective disk sector is not in use;

for each respective disk sector that is in use at the second time: storing information with the second backup representation indicating that the respective disk sector is in use; using the metadata of the virtual disk image file to read data from the respective disk sector; computing a new fingerprint for the respective disk sector based on the data of the respective disk sector; storing the new fingerprint in association with the second backup representation; determining whether the respective disk sector was previously in use at the first time when the first backup representation was created; if the respective disk sector was not previously in use then copying the data from the respective disk sector into the second backup representation; if the respective disk sector was previously in use then retrieving the first fingerprint for the respective disk sector stored in association with the first backup representation, comparing the new fingerprint to the first fingerprint to determine whether the data of the respective disk sector has changed since the first backup representation was created, and copying the data from the respective disk sector into the second backup representation if the respective disk sector has changed.

* * * * *